(12) United States Patent
Tamura et al.

(10) Patent No.: US 6,940,886 B2
(45) Date of Patent: Sep. 6, 2005

(54) LASER OSCILLATOR

(75) Inventors: Motohide Tamura, Tokyo (JP); Satoshi Nishida, Tokyo (JP); Masanori Aoyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 237 days.

(21) Appl. No.: 09/820,970

(22) Filed: Mar. 30, 2001

(65) Prior Publication Data

US 2001/0028670 A1 Oct. 11, 2001

(30) Foreign Application Priority Data

Mar. 31, 2000 (JP) .......................................... P2000-096157

(51) Int. Cl.$^7$ ................................................ H01S 3/22
(52) U.S. Cl. ........................................... 372/59; 372/55
(58) Field of Search ............................... 372/55–59, 34

(56) References Cited

U.S. PATENT DOCUMENTS 4,261,753 A * 4/1981 Holcombe ................... 106/56
4,651,324 A * 3/1987 Prein et al. ................... 372/59
4,815,092 A * 3/1989 Chartier ....................... 372/59
4,897,848 A * 1/1990 Macken ........................ 372/59
4,905,249 A * 2/1990 Turner .......................... 372/59
5,337,329 A * 8/1994 Foster .......................... 372/61
5,550,851 A * 8/1996 Guch et al. ................... 372/59
5,771,258 A * 6/1998 Morton et al. ................ 372/57
6,060,628 A * 5/2000 Aoyama et al. ............. 570/134

FOREIGN PATENT DOCUMENTS

JP          8-32151      * 2/1996     ............ H01S/3/036

* cited by examiner

Primary Examiner—Minsun Oh Harvey
Assistant Examiner—James Menefee
(74) Attorney, Agent, or Firm—Sughrue Mion, PLLC

(57) ABSTRACT

A laser oscillator includes: electrode tubes 15, for employing a discharge to excite a laser gas 10, and for generating a laser beam 11; a box 13, for storing parts, such as the electrode tubes 15; and an optical catalyst layer 20, which is formed on the inner walls of the box 13.

6 Claims, 15 Drawing Sheets

LASER OSCILLATOR

BACKGROUND OF THE INVENTION

1. Field of the Invention

The present invention relates to a laser oscillator, and relates in particular to the extension of the service lives of parts and members in a case, and to the limiting of the deterioration of a laser gas.

2. Description of the Related Art

A conventional carbon dioxide laser apparatus will now be described while referring to FIG. 13. FIG. 13 is a schematic diagram illustrating a conventional carbon dioxide laser apparatus. In FIG. 13 is shown a carbon dioxide laser apparatus, comprising a laser oscillator 1, a discharge electrode 2, a partial reflector 4, a full reflector 5, a heat exchanger 6 and a power supply board 8, in which devices are stored that precipitate a discharge at the discharge electrode 2, that control a gas circulation blower 3, and that set up the laser oscillator 1 in a vacuum state. A cooling unit 7 cools the partial reflector 4, the full reflector 5 and the heat exchanger 6 by conveying cooling water thereto, and a controller 9 controls the operation of the laser oscillator 1. A laser gas 10 fills the interior of the oscillator 1, and a laser beam 11 is emitted by the laser oscillator 1.

The operation of the laser oscillator 1 in FIG. 13 will now be explained. First, when a start signal is transmitted by the controller 9 to the power supply board 8, the gas circulation blower 3 is rotated, and the laser gas 10, which for the carbon dioxide laser apparatus consists of a mixture of $CO_2$, $N_2$ and He that fills the interior, is circulated throughout the laser oscillator 1. Then, when in this state an output signal is received from the controller 9, a high voltage that is applied to the discharge electrode 2 excites molecules in the laser gas 10. The molecules $N_2$, which are excited by the discharge, hold kinetic energy, and initiate active movement within the laser gas 10 by colliding with $CO_2$ molecules, to which the kinetic energy they hold is transferred. The $CO_2$ molecules, after a specific time has elapsed following the transferral to them of the kinetic energy, emit light and then fall to a stable ground level. The quantity of light emitted depends on the quantity of the $CO_2$ and the $N_2$ molecules that are excited by the discharge. The emitted light is reflected and amplified between the partial reflector 4 and the full reflector 5. Since a part of the light is extracted by the partial reflector 4, and the remaining light is further reflected and returned by the full reflector 5, the reflection and amplification process is repeatedly performed.

A quantity of the laser beam 11 equivalent to the output instructed by the controller 9 is emitted externally. Since in the arrangement in FIG. 13 the direction in which the laser beam 11 is emitted, the direction in which a discharge occurs, and the direction in which the laser gas 10 passes through the discharge electrode 2 are perpendicular to each other, this is called a three-axis orthogonal type. For this, the extracted laser beam 11 is focused on a machine or a measurement device (not shown) to perform a machining process or to obtain a measurement.

The internal detailed structure of the laser oscillator 1 in FIG. 13 is shown in FIG. 14. A box 13 is a sealed container that is filled with the laser gas 10, but at a concentration, since a stable discharge is required in order to obtain a stable laser output, that is less than one atmosphere. Windows, on both sides of the box 13, are provided to facilitate the insertion and removal of internal parts for production or for maintenance, and doors 14 are attached to close and seal these windows. Screws are employed to secure the doors 14 to the box 13, and O rings (not shown) are used to provide airtight seals for them.

The main parts inside the box 13 are the discharge electrodes 2, the gas circulation blower 3, the partial reflector 4 and the full reflector 5 (not shown), and the heat exchanger 6, which have been explained while referring to FIG. 13. Each of the discharge electrodes 2 includes an electrode tube 15 and an insulator 16, and of these the electrode tube 15 is constituted by a water channel 15a, along which cooling water is supplied to the interior, a metal tube 15b for covering the water path 15a and a dielectric 15c for covering the metal tube 15b. A material such as glass, having a higher permittivity than the insulator 16, is employed as the dielectric 15c. Thus, when a high frequency voltage is applied by the power supply board (not shown in FIG. 14) to the two electrode tubes 15, which are separately arranged at a specific distance from each other, a very smooth and stable discharge can be generated through the dielectric 15c. In order to prevent a discharge from other than the opposed, facing portions of the electrode tubes 15, the opposed, facing faces of the electrode tubes 15 are partially exposed, while the other portions are covered with the insulator 16. In addition, insulating joints 17 and pipes 18 are also provided for cooling the electrode tubes 15. And to cool the laser gas 10, which passes between the discharge electrodes 2, it is introduced, along a gas duct 25, to the heat exchanger 6.

For the carbon dioxide laser oscillator to generate the laser beam 11, a discharge occurs between the two electrode tubes 15. By means of the discharge, not only is the $N_2$ excited, but also heat and ultraviolet rays are generated. As is shown in FIG. 15, the wavelength of the emission spectrum produced by the discharge is distributed mainly between 280 nm and 450 nm, and an emission of ultraviolet rays equal to or less than 300 nm was observed. Normally, most light having a wavelength of 300 nm or less is absorbed by the atmosphere, and a transmittance of only about 1% is acquired. However, as previously mentioned, since the carbon dioxide laser is activated in a state wherein a pressure considerably less than one atmosphere is maintained, generally wherein the pressure ranges from $\frac{1}{10}$ to $\frac{1}{3}$ of an atmosphere, a high transmittance is obtained for a wavelength of 300 nm.

When a laser beam is generated by a conventional laser oscillator, ultraviolet rays are produced by a discharge. For this, the laser oscillator 1 employs as a laser gas a mixture of $CO_2$, $N_2$ and He, and when a discharge occurs, $CO_2$ is decomposed and NOX is generated.

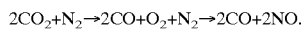

$$2CO_2+N_2 \rightarrow 2CO+O_2+N_2 \rightarrow 2CO+2NO.$$

It should be noted that NO in the chemical formula may further react with oxygen (O) and be changed to $NO_2$.

Due to the generation of NOX, the oxygen in the laser gas in the box 13 is consumed, thereby reducing the quantity of $CO_2$. Thus, for a sealed laser oscillator 1 a problem that arises is a reduction in the strength of the laser that is output. For a conventional sealed laser oscillator 1, for which the laser gas 10 is employed inside a sealed container, the box 13, the length of time the laser oscillator 1 can be continuously operated in the sealed state is severely limited, due generally to the deterioration suffered by the laser gas 10, i.e., the reduction in the $CO_2$ and a slight leakage of the laser gas 10 from the container 13.

Thus, the laser gas 10 in the box 13 must be changed frequently, a situation that contributes to the untoward wasting of the laser gas 10. And inside the box 13, the ultraviolet rays that are generated are scattered and reflected by interior faces, such as those of the doors 14, so that they strike the insulators 16, the joints 17 and the O rings of the discharge electrodes 2, accelerating the deterioration and reducing the useful life of these and other laser oscillator 1 parts, and necessitating the frequent performance of maintenance.

The above problem corresponds to a problem described, for example, in JP-A-5-136506 and JP-A-4-100284 related to the deterioration by the laser gas and ultraviolet rays of the components in a container. In these publications, the excimer laser oscillator is disclosed, and deterioration of the parts is prevented by constructing them of a material such as fluorocarbon resin or ceramics. However, for the carbon dioxide laser oscillator described in these specifications, the gas pressure in the box 13 tends to be less than one atmosphere, and in such a case, the transmittance of ultraviolet rays having a wavelength equal to or smaller than 300 nm is increased, even when parts (members) are made of a fluorocarbon material. Thus, it is apparent that deterioration is accelerated when the internal members are irradiated by the ultraviolet rays.

When vinyl chloride (C—Cl) is used, molecular binding is severed by a light having a wavelength that is equal to or less than 360 nm, while the molecular binding of polyester (C—O) is severed by a light having a wavelength equal to or less than 340 nm, and the molecular binding of a fluorocarbon resin (C—F, C—H) is severed by a light having a wavelength equal to or less than 300 nm. When fluorocarbon resin is decomposed and fluorine (F) is released into the box 13, normally, the optimal dew point for laser oscillation is −40° C. to −60° C. and a slight trace of water must be present. But it has been found that when fluorine binds to the water $H_2O$ present in the laser gas 10, very corrosive hydrogen fluoride (HF) is generated. Then, according to the following mechanism, the hydrogen fluoride damages the glass dielectric 15c and the silicon insulator 16 that are used for the discharge electrodes 2 of the laser oscillator 1.

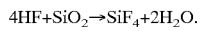

$$4HF + SiO_2 \rightarrow SiF_4 + 2H_2O.$$

Since the joint 17 is connected to the discharge electrodes 2 to which a high voltage is applied at a high frequency, the joint 17 must be composed of a resin having a low transmittance, and a ceramic having a high transmittance is not appropriate because a creepage discharge is generated. Further, fluoride rubber, such as viton, is used for the O ring because the deterioration of the O ring is accelerated under these conditions. And of the resins, a fluoride resin has proven to be the most resistant when used in places irradiated by ultraviolet rays of 300 nm. Since no other materials have been found to be more appropriate than those presently in use, the current technique can not prevent the discharge of hydrogen fluoride.

In addition, a system for protecting the discharge electrodes using a nonorganic insulator, such as glass, is described in JP-A-10-303483. In an environment in which hydrogen fluoride is present, glass is damaged, and a dust consisting of $SiF_4$ is discharged inside the sealed container, or the dielectric made of glass can not be protected, so that the life of the discharge tube is reduced.

SUMMARY OF THE INVENTION

To resolve these shortcomings, it is one objective of the present invention to provide a laser oscillator that aggressively absorbs or captures ultraviolet rays that are generated due to a discharge by a gas laser, or that reduces the hazardous hydrogen fluoride that is generated by ultraviolet ray irradiation, so that the deterioration of the parts inside a box can be prevented, even when the laser oscillator is used for an extended period of time, and so that a long-lasting stable quality can be maintained.

According to one aspect of the present invention, a laser oscillator comprises:

laser oscillation means for employing a discharge to excite a laser and to generate a laser beam;

a box for storing the laser oscillation means; and an optical catalyst layer formed on the inner wall of the box.

Further, according to another aspect of the present invention, a laser oscillator comprises:

laser oscillation means for employing a discharge to excite a laser gas and to generate a laser beam;

a box for storing the laser oscillation means; and a plate member, provided inside the box, on which an optical catalyst layer is formed.

The optical catalyst layer decomposes nitrogen oxide (NOX)

According to an additional aspect of the invention, a laser oscillator comprises:

laser oscillation means for employing a discharge to excite a laser gas and to generate a laser beam;

a box for storing the laser oscillation means; and a graphitized layer formed on the inner wall of the box.

According to a further aspect of the invention, a laser oscillator comprises:

laser oscillation means for employing a discharge to excite a laser gas and to generate a laser beam;

a box for storing the laser oscillation means; and a plate member, provided inside the box, on which a graphitized layer is formed.

The graphitized layer absorbs ultraviolet rays.

According to one more aspect of the invention, a laser oscillator comprises:

layer oscillation means for employing a discharge by a pair of discharge electrodes that face each other across an intervening discharge space to excite a laser gas and to generate a laser beam;

reflection means for receiving ultraviolet rays generated by the laser oscillation means, and for reflecting the ultraviolet rays so that the reflected light passes through the discharge space between the pair of discharge electrodes; and a box for storing the laser oscillation means and the reflection means.

The laser oscillator further comprises:

a sensor provided in the box to detect the ultraviolet rays.

According to yet another aspect of the invention, a laser oscillator comprises:

laser oscillation means for employing a discharge to excite a laser gas and to generate a laser beam;

cooling means for cooling the laser gas that is heated by the discharge;

a collector; and a box for storing the laser oscillation means, the cooling means and the collector, wherein the collector is located between the cooling means and the laser oscillation means along a path followed by the laser gas while circulating inside the box.

Activated carbon is used as the collector.

Aluminous silica gel is used as the collector.

The activated carbon is stored in a container having a mesh smaller than the particle diameter.

The aluminous silica gel is stored in a container having a mesh smaller than the particle diameter

DETAILED DESCRIPTION OF THE PREFERRED EMBODIMENTS

Now, a description will be given in more detail of preferred embodiments of the invention with reference to the accompanying drawings.

First Embodiment

Figure 1:
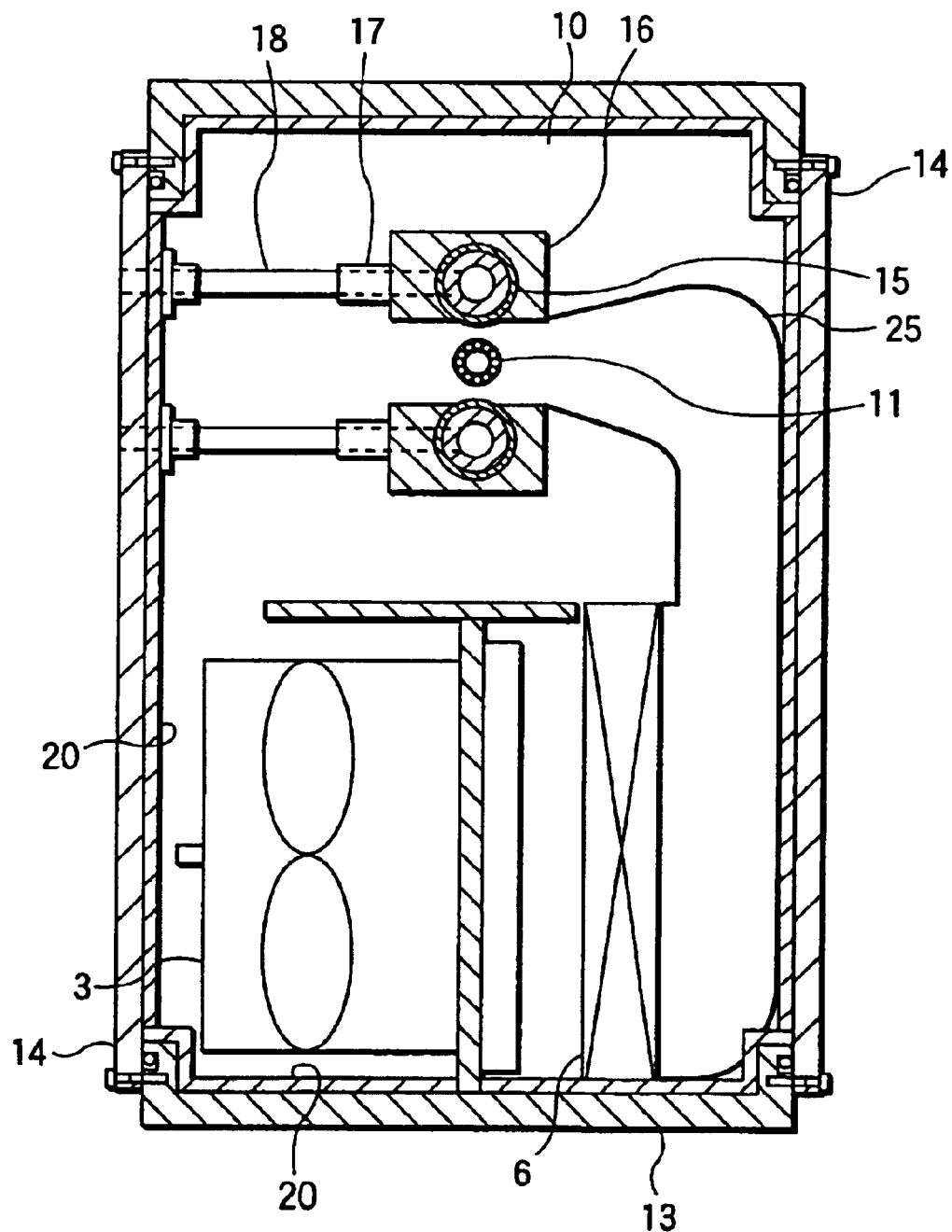
FIG. 1 is a schematic diagram illustrating a laser oscillator according to a first embodiment of the invention.
Figure 14:
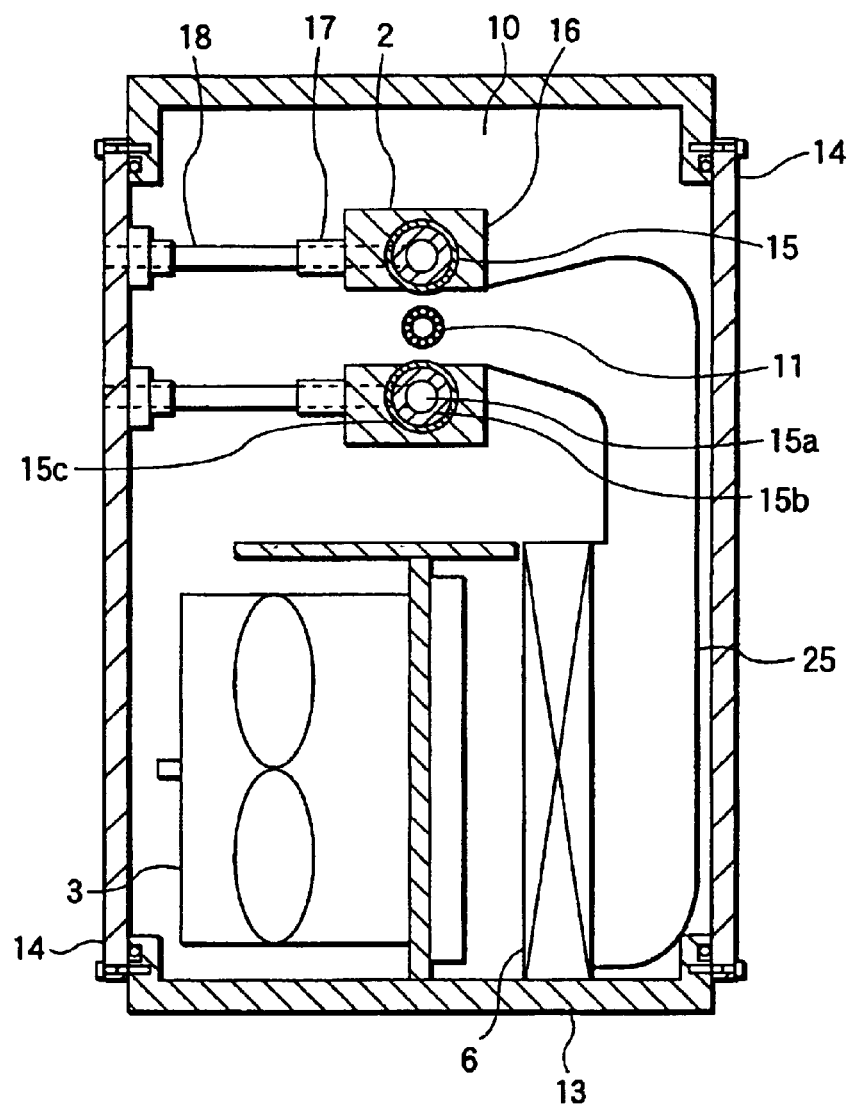
FIG. 14 is a schematic diagram illustrating a conventional laser oscillator.
Figure 15:
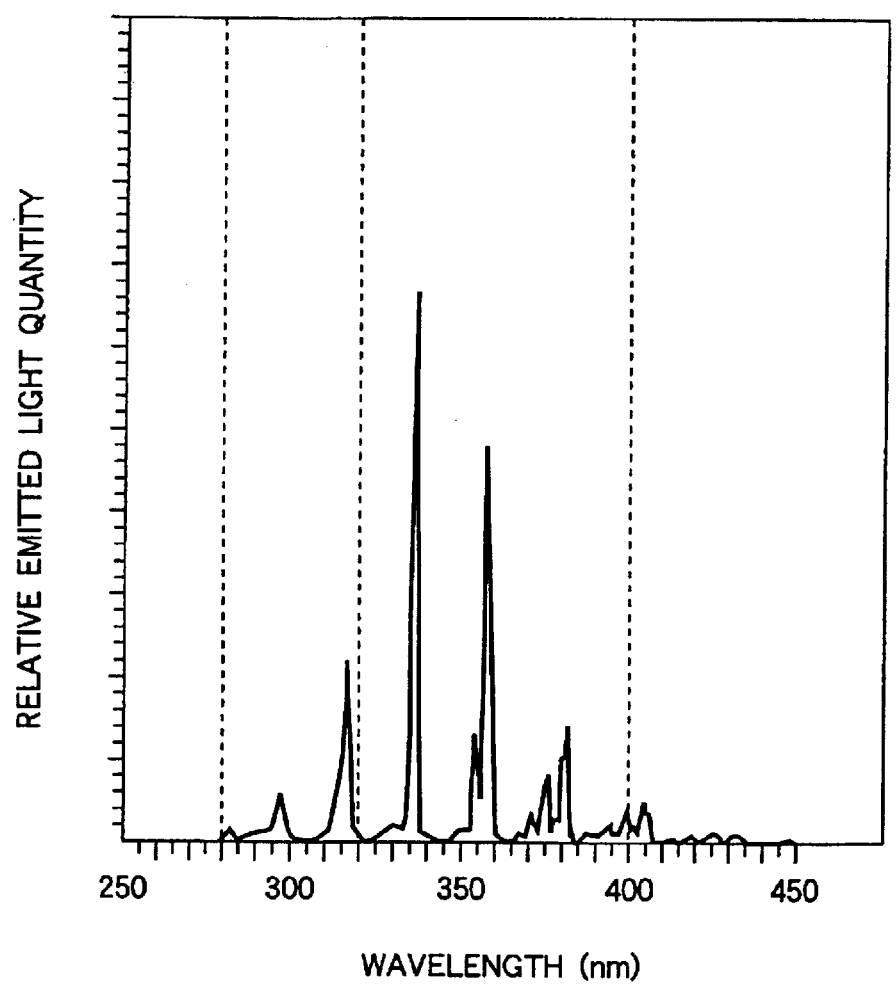
FIG. 15 is a graph showing the emission spectrum produced by a discharge.

A laser oscillator according to a first embodiment of the invention will now be described while referring to FIG. 1. In FIG. 1 since components denoted by reference numbers 3, 6, 10, 11, 13 to 18 and 25 correspond to or are identical to those used for the prior art in FIG. 14, no further explanation for them will be given. In FIG. 1, for this embodiment, a surface processed layer 20 formed on the inner faces of a box 13 and doors 14 is an optical catalyst layer.

A surface process is used to form the optical catalyst layer 20 on the inner faces of the box 13 and the doors 14. $TiO_2$ is an example for the material used for the optical catalyst layer 20. Thermal spraying is an example method that can be used when employing $TiO_2$ for the surface processing. According to this method, the melted powder material, after being sprayed on a material using a plasma jet device, solidifies and forms a film. Since particles of 10 to 60 μm solidify evenly, a laminated film can be deposited on the surface that effectively prevents the reflection of ultraviolet rays.

As an example application of $TiO_2$, as is described in JP-A-10-149708, $TiO_2$ is used to coat the light-transmitting container of a lighting device, and air washing is performed. In this publication, however, an optical catalyst layer is formed on the outer walls of light-transmitting doors, and the external NOX is processed by internally emitted ultraviolet rays. Whereas according to invention, by coating the inside of the laser oscillator with the optical catalyst layer 20, the surface process facilitates the accelerated absorption of ultraviolet rays, and NOX produced internally is reduced and is prevented from being discharged to the exterior. The mechanism of the process performed by the optical catalyst layer 20 is as follows. A reduction in the output of the laser is limited by re-generating $CO_2$ by decomposing the NOX and CO in the laser gas 10 that are generated by a discharge.

That is, a constant quantity of $CO_2$ is maintained to sustain a more stable laser output. Therefore, by using the optical catalyst layer 20 to decompose NOX, deterioration of the laser gas 10 can be prevented.

Further, the $O_2$ obtained by decomposition is bound to CO that is generated by the discharge, and $CO_2$ is produced.

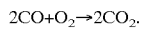

In this manner, the reduction of the $CO_2$ in the laser gas 10, which occurs when a laser beam 11 is generated by a discharge, is reversed, thereby precluding a permanent change in the composition of the laser gas 10.

Figure 2:
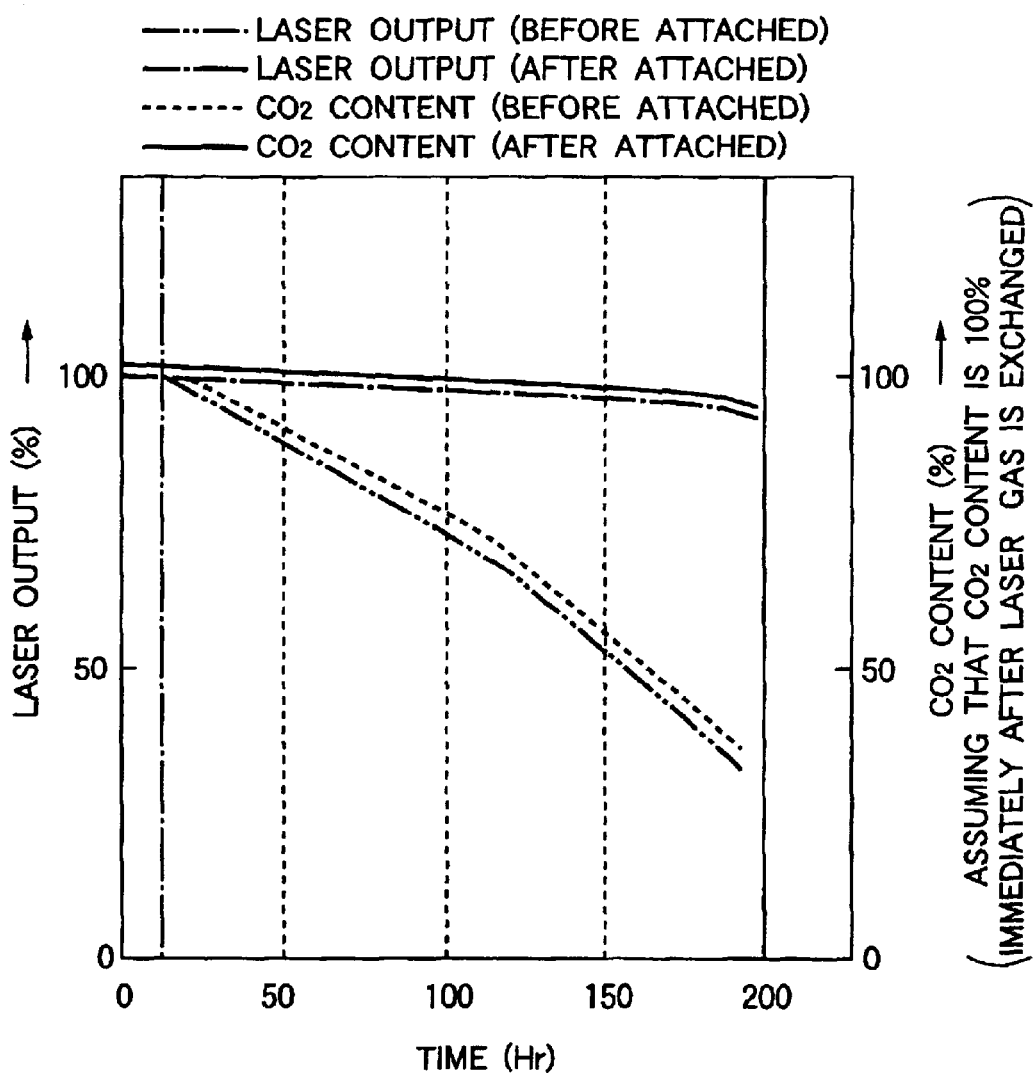
FIG. 2 is a graph showing a comparison of the $CO_2$ content of the laser gas and the laser output.

FIG. 2 is a graph showing a comparison of the relationships existing between the $CO_2$ content of the laser gas 10 and the laser output before and after the optical catalyst layer 20 is deposited. Note that the laser output fluctuates in accordance with the $CO_2$ content of the laser gas 10.

Before the optical catalyst layer 20 is deposited, beginning at the point at which the initial deterioration of the laser gas 10 occurs, i.e., at the time the reduction in the $CO_2$ begins, there is a continuing decrease in the laser output that corresponds to the rate of deterioration of the laser gas 10. After the optical catalyst layer 20 is deposited, however, because deterioration of the laser gas 10 is inhibited by the optical catalyst layer 20, which limits changes in the composition of the laser gas 10 by preventing a reduction in the volume of $CO_2$ therein, there is almost no decrease in the laser output, and a stable laser output is maintained until a fluctuation in the internal pressure occurs as a result of the leakage of gas from the box 13.

According to this embodiment, since the reduction in $CO_2$ that occurs as a result of consumption is countered by the reproductive action of the optical catalyst layer 20, deterioration of the laser gas 120 can be limited and the operating time in the sealed state can be extended. When 100% of the consumed quantity of $CO_2$ is reproduced, one of the factors that limit the operating time in the sealed state is removed. So that while in the sealed state the continuous operating time for a conventional laser oscillator is about 12 hours, in the sealed state, the continuous operating time for the laser oscillator proposed by the inventor in this embodiment can be extended until it is 15 times as long, about 180 hours.

In addition, since a surface process for the high absorption of ultraviolet rays is performed, ultraviolet rays are absorbed by the optical catalyst layer 20, and since irradiation of the insulators 16, the joints 17 and the pipes 18 is thereby prevented, the useful lives of these parts are extended.

Second Embodiment

Figure 3:
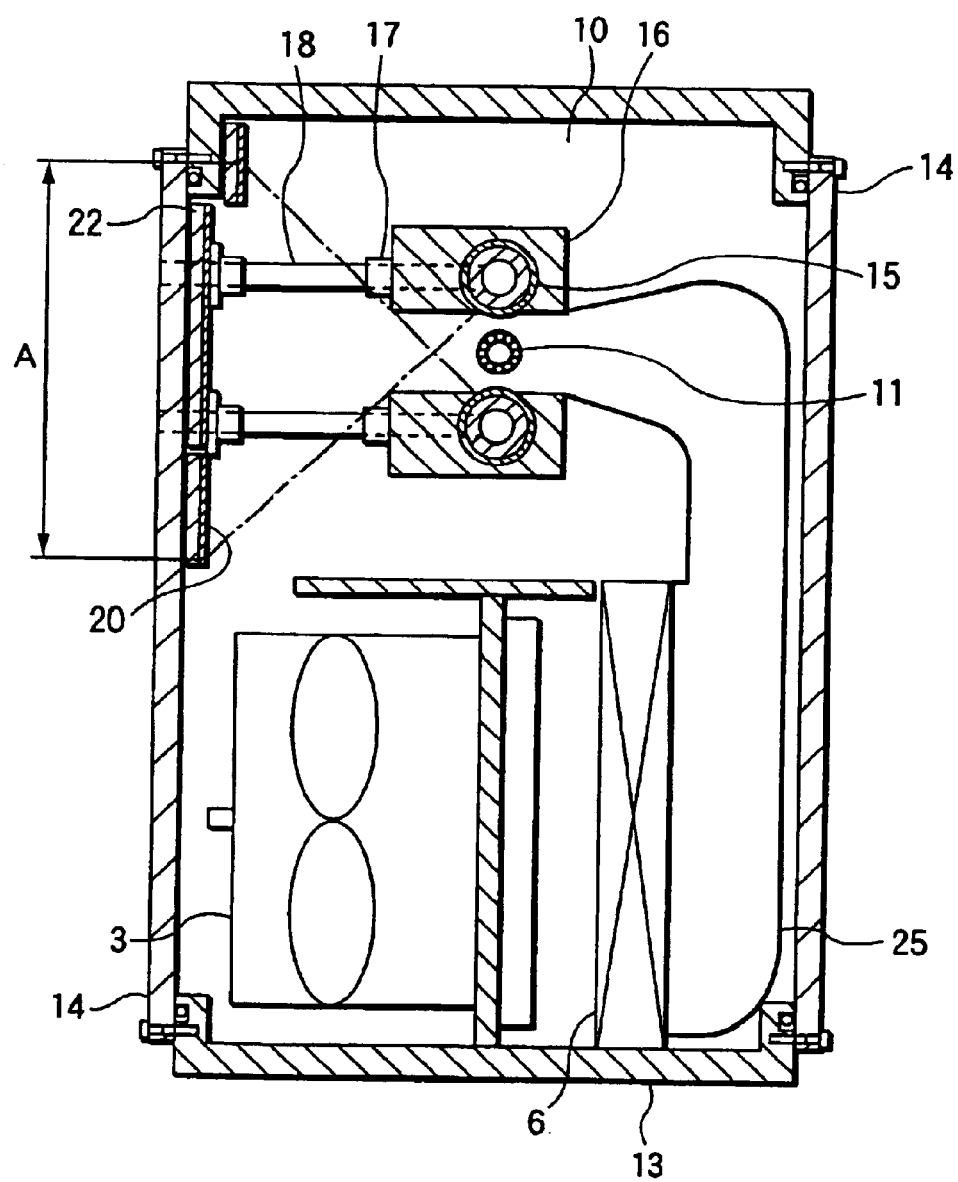
FIG. 3 is a schematic diagram illustrating a laser oscillator according to a second embodiment of the invention.

A laser oscillator according to a second embodiment of the invention will now be explained while referring to FIG. 3. In FIG. 3, components denoted by reference numbers 3, 6, 10, 11, 13 to 18, 20 and 25 are identical to or correspond to those shown in FIG. 1, and no further explanation for them will be given. Also in FIG. 3, an optical catalyst layer 20 is deposited on the surface of a metal plate 22.

The catalytic action of the optical catalyst layer 20 functions semi-permanently because of the properties it possesses. As is described above, however, a laser gas 10, which is circulated through a box 13 of the laser oscillator by a gas circulation blower 3, passes between a pair of discharge electrodes 2, and thus, when as time elapses deterioration of internally provided parts occurs and the parts are partially changed to dust, the dust is attached to the surface of the optical catalyst layer 20 and degrades its function. And while the portions whereat no dust is attached continue to function normally, at those portions whereat the dust is attached the function is greatly deteriorated, and therefore, the local replacement of the optical catalyst laser 20 is required. For the deposition and replacement of the optical catalyst layer 20, as is shown in FIG. 3, since the metal plate 22, on the surface of which the optical catalyst layer 20 is deposited, is provided and is attached to the box 13 and doors 14, only this metal plate 22 need be replaced when the effect of the optical catalyst layer 20 is reduced. Thus, the optical catalyst layer 20 can be replaced comparatively easily, and the useful lives of the parts in the laser oscillator are extended.

Further, since the metal plate 22 that is employed has a desired size, as is shown in FIG. 3, when the optical catalyst layer 20 that is deposited on all the inner walls of the box 13 and the doors 14 in the first embodiment must only be attached to the minimum required area A that appears to be irradiated by ultraviolet rays produced by electrode tubes 15, substantially the same effects are acquired as are obtained in the first embodiment. In the laser oscillator in FIG. 3, a gas duct 25 downstream of the laser gas discharge area is irradiated by ultraviolet rays, but since the duct 25 is curved, the ultraviolet rays do not return to the resin portion, and thus there is little need for the optical catalyst layer 20 downstream, whereas upstream of the laser gas discharge area, ultraviolet rays emitted by the electrode tubes 15 are projected radially and strike the area A in FIG. 3. Since deterioration of the resin portion is accelerated by the reflection of ultraviolet rays, only on this portion must the optical catalyst layer 20 be deposited to absorb ultraviolet rays.

For the laser oscillator in this embodiment, the size of a metal plate 22 is equal to or smaller than 1/15 of the door 14, and a compact metal plate 22 can be provided.

Third Embodiment

Figure 4:
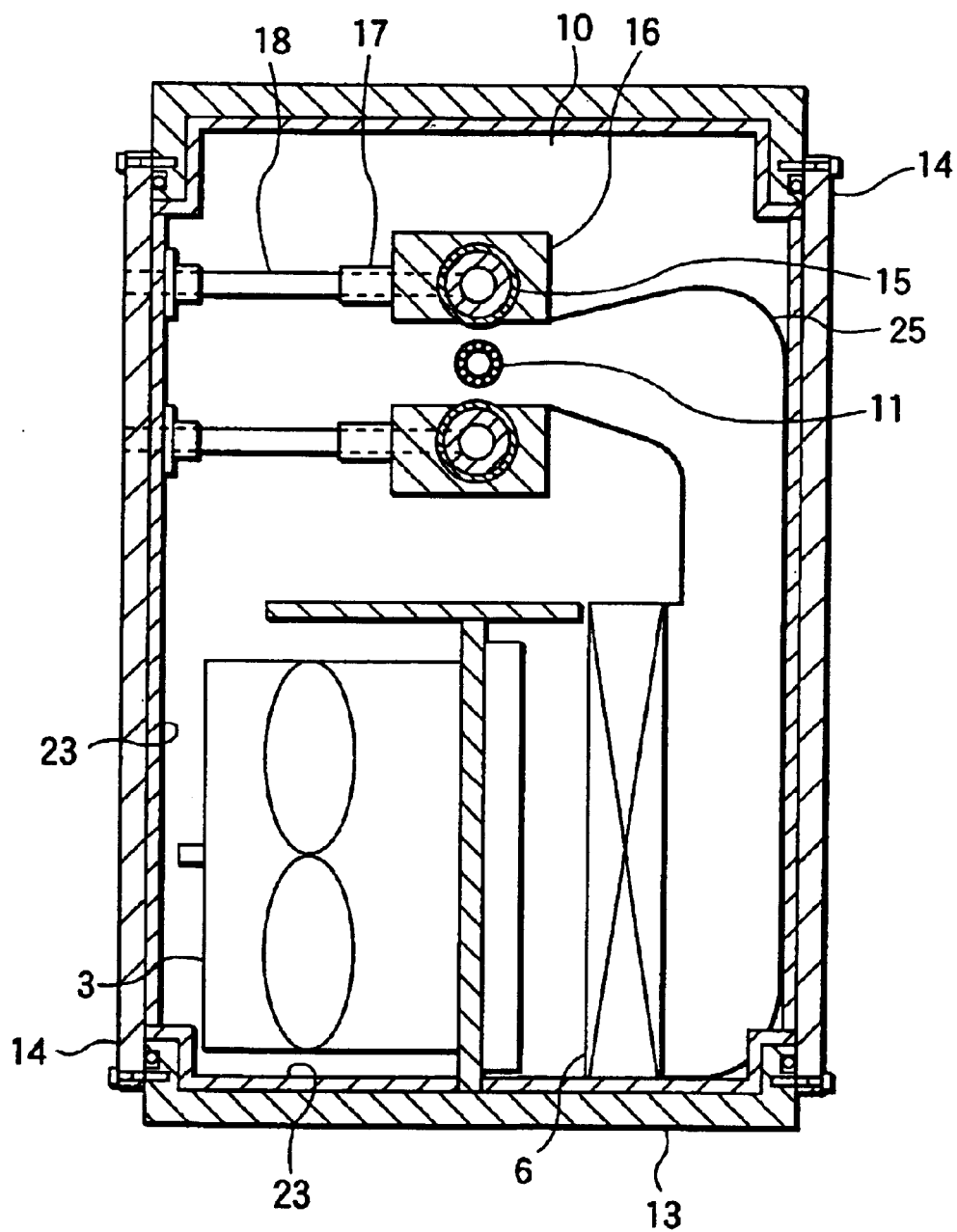
FIG. 4 is a schematic diagram illustrating a laser oscillator according to a third embodiment of the invention.

A laser oscillator according to a third embodiment of the invention will now be described while referring to FIG. 4. In FIG. 4, components denoted by reference numerals 3, 6, 10, 11, 13 to 18 and 25 are identical to or correspond to those in FIG. 1, and no further explanation for them will be given. Also, in FIG. 4, according to this embodiment, a surface processed layer 23 formed on the inner walls of a box 13 and doors 14 is a graphitized layer.

The graphitized layer 23 is deposited on the inner walls of the box 13 and the doors 14. Thus, when ultraviolet rays are generated by a discharge, they scatter inside the box 13. When the ultraviolet rays strike the graphitized layer 23 deposited on the surfaces of the box 13 and the doors 14, almost 90% are absorbed, and almost none are reflected. Therefore, the irradiation by the ultraviolet rays of insulators 16, joints 17 and pipes 18 is prevented, without the ultraviolet rays being spread throughout the box 13, and the generation of hydrogen fluoride (HF) is suppressed. Since the generation of hydrogen fluoride is suppressed, the deterioration of parts due to the severing of the bindings of macromolecular materials is prevented, and the useful lives of the parts in the laser oscillator are extended.

Figure 12:
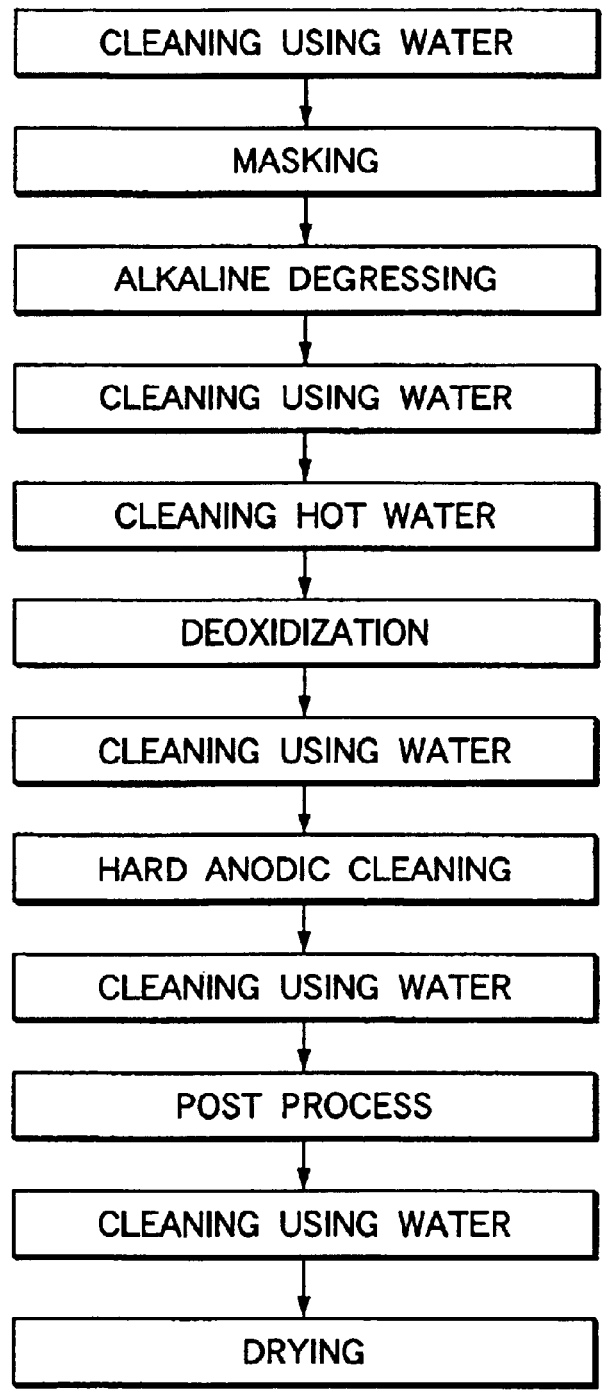
FIG. 12 is a flowchart showing the schematic processing employed to generate an oxide film on the surface of aluminum.
Figure 13:
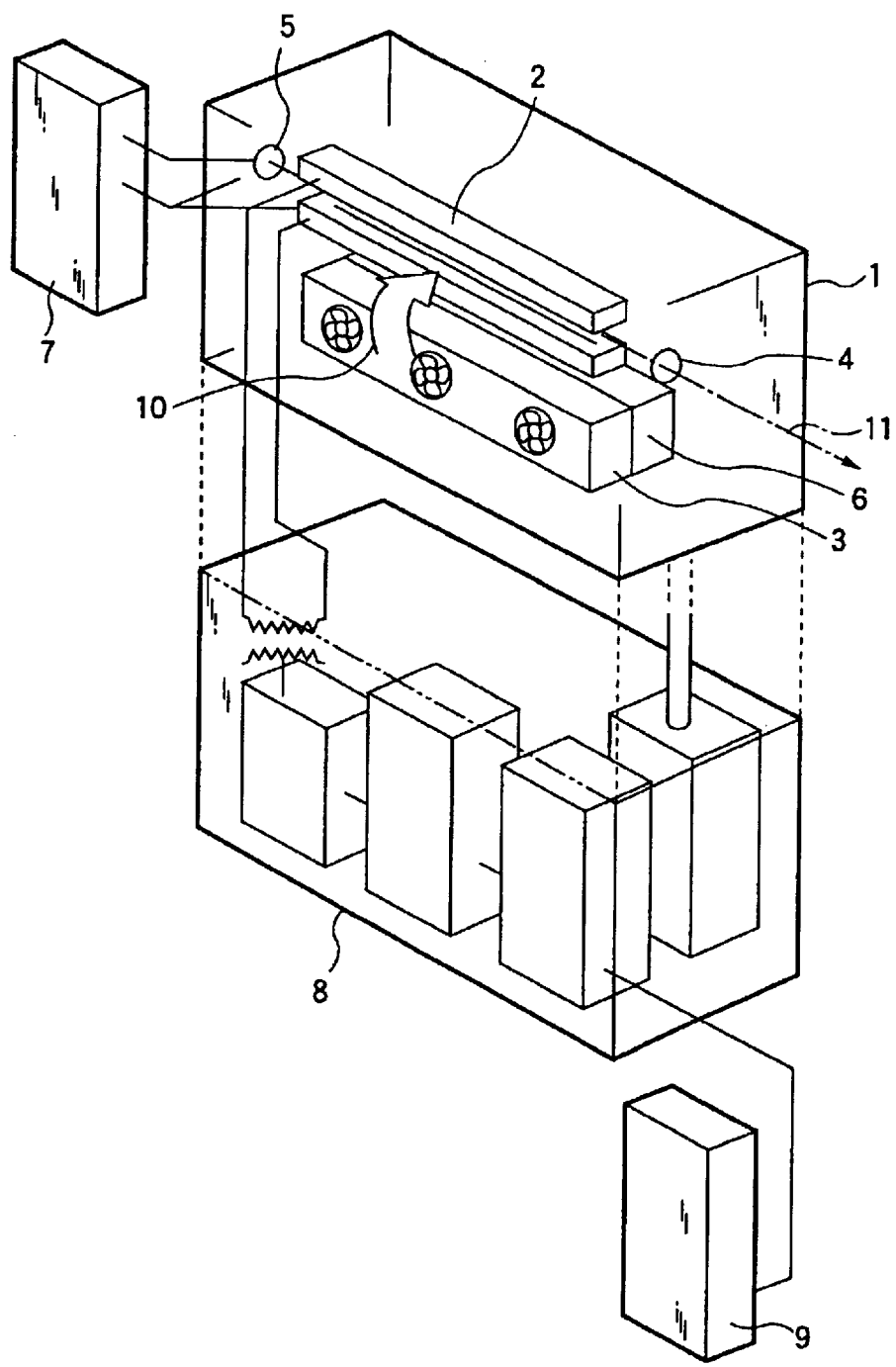
FIG. 13 is a schematic diagram showing the configuration of a conventional carbon diode laser device.

Various methods are available for use for graphitizing the surface of metal in accordance with the wavelength of the ultraviolet ray. In this embodiment, since the graphitized metal is to be employed in a special atmosphere for which a laser gas 10 is used in the box 13 of the laser oscillator 1, when graphitization is performed by applying a resin or an organic material, or by using an organic dye, the organic material will be decomposed by the ultraviolet rays, and this will accelerate the deterioration of the other parts: Therefore, a method by which an aluminum material is immersed in an acid tank to form an oxide film on its surface is employed to graphitize the metal without using an organic dye. FIG. 12 is a diagram showing the schematic processing used to form an oxide film on the surface of aluminum.

For the processing in FIG. 12, since the graphitization color differs depending on the composition of the material used, even through the same surface processing is employed, by studying the ingredients employed for aluminum it was found that aluminum containing a large amount of Mg is effective. In our experiment, a material A6061 was found to be especially superior. Further, for the above processing, multiple holes were formed in the oxide film, and it was found that when heated, sulfur was volatilized from the holes and adversely affected laser oscillation. To limit volatilization, the use of a method whereby aluminum is immersed in and cleaned in hot water is required.

Figure 11:
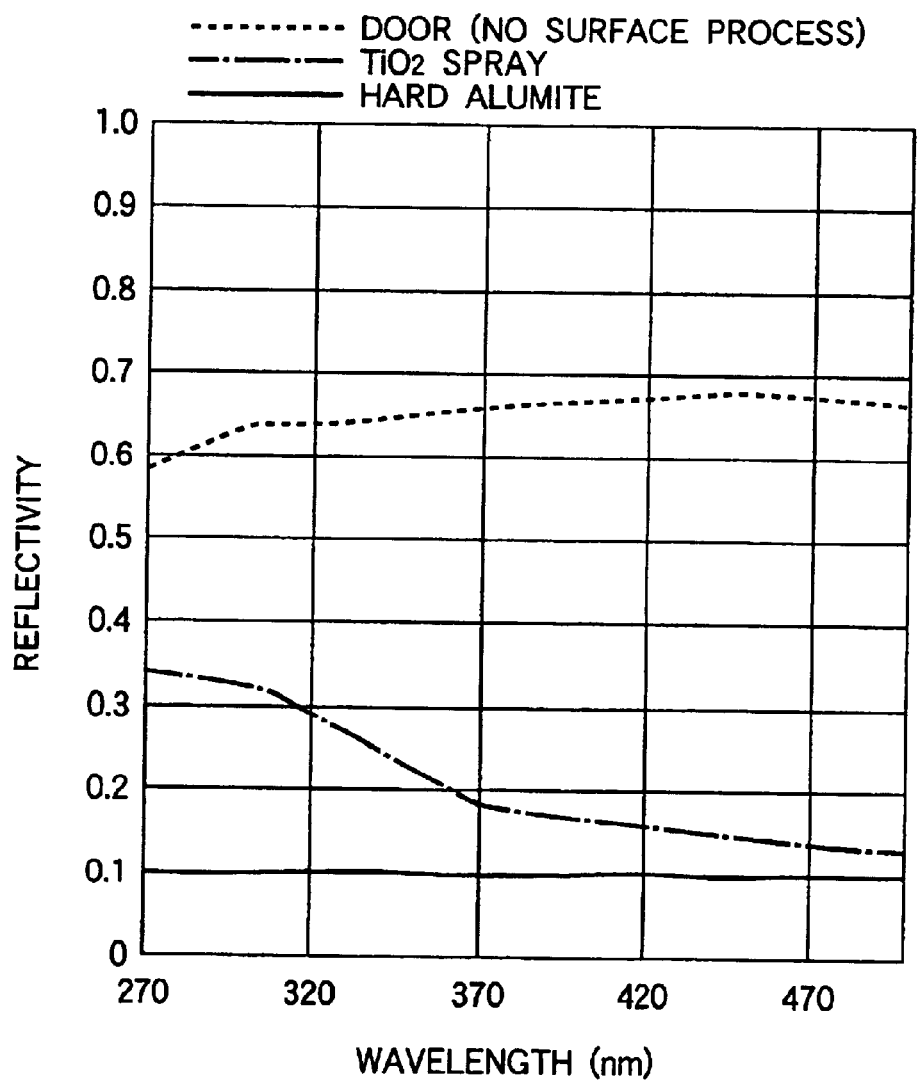
FIG. 11 is a graph showing the reflectivities of a $TiO_2$ layer and a graphitized layer relative to ultraviolet rays.

FIG. 11 is a graph showing the effects obtained by the graphitization process in accordance with the wavelengths of ultraviolet rays. Assuming that for a mirror-finished Al face at a wavelength of 350 nm the ultraviolet ray reflectivity of common aluminum (A5052) was 60%, the reflectivity of thermally sprayed $TiO_2$ was about 25%, and the reflectivity of a graphitized layer was about 10%.

When the ultraviolet ray reflectivities of an optical catalyst layer 20 made of $TiO_2$ and a graphitized layer 23 are compared, it is apparent that the graphitized layer 23 satisfactorily absorbs ultraviolet rays, and that the reflectivity of the graphitized layer 23, relative to the optical catalyst layer 20, can be limited to 40%. Therefore, the useful lives of the parts can be extended 2.5 times.

Furthermore, when Fe is employed as the material, for electroless plating a black process is preferable in which an eutectoid reaction of particles, such as carbide, is effected, and black compound plating is provided. With this process, the same effects are acquired as are obtained using hard Alumilite.

Since a container is employed, before the graphitized layer 23 is formed on the inner walls of the box 13 and the doors 14, surface finishing is required so that the joined portions can be adequately sealed by packing, such as an O ring.

Fourth Embodiment

Figure 5:
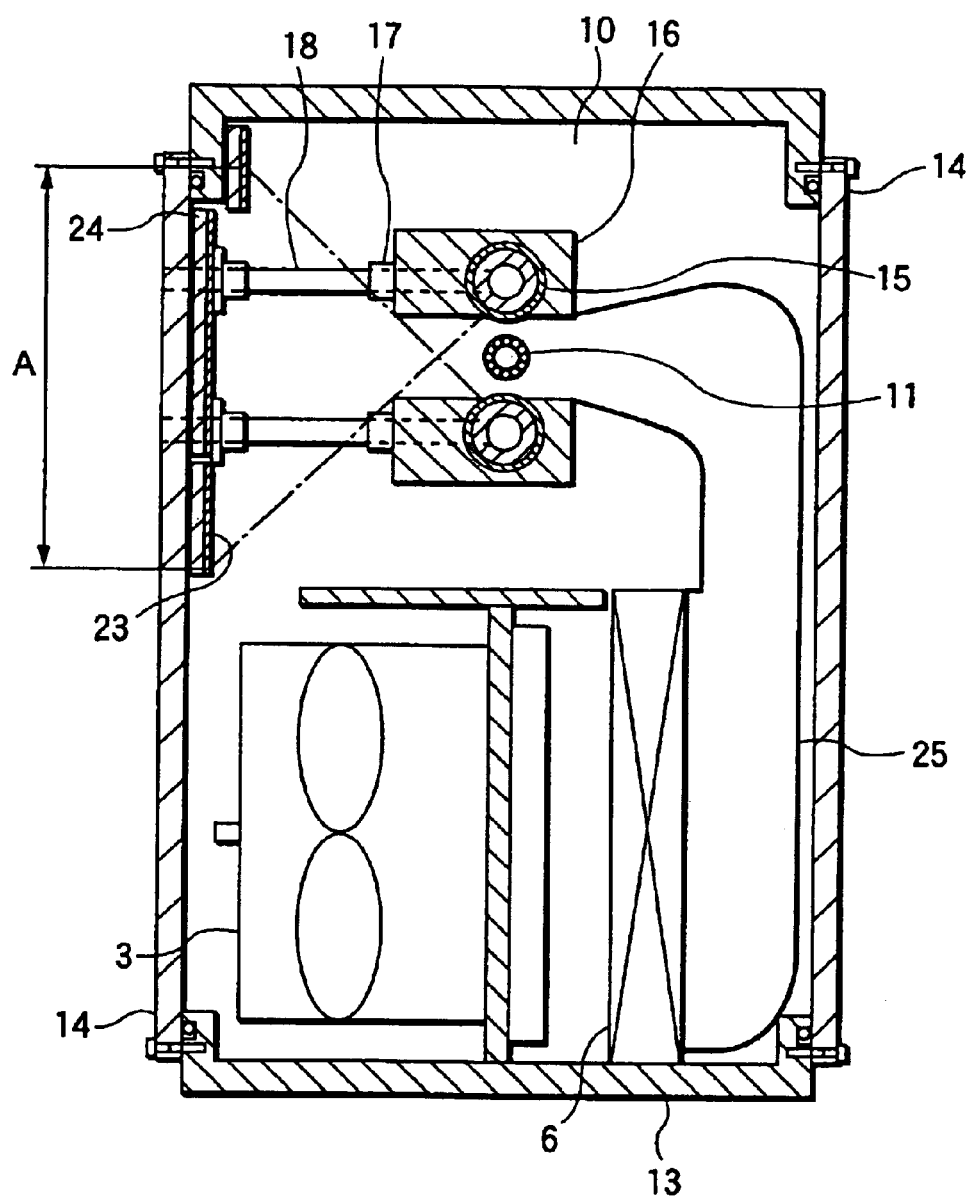
FIG. 5 is a schematic diagram illustrating a laser oscillator according to a fourth embodiment of the invention.

A laser oscillator according to a fourth embodiment of the invention will now be described while referring to FIG. 5. In FIG. 5, components denoted by reference numerals 3, 6, 10, 11, 13 to 18 and 25 are identical to or correspond to those in FIG. 3, and no further explanation for them will be given. Further, since a graphitized layer 23 is the same as the one described in the third embodiment, no further explanation for it will be given. Also, in FIG. 5, the graphitized layer 23 is deposited on the surface of a metal plate 24.

Since, as is shown in FIG. 5, the metal plate 24, on the surface of which the graphitized layer 23 is deposited, is attached to a box 13 and doors 14, only the metal plate 24 must be replaced when the effectiveness of the graphitized layer 23 is reduced. Thus, the graphitized layer 23 can be replaced comparatively easily, and the useful lives of the parts in the laser oscillator are extended.

Furthermore, since a metal plate 24 having a desired size is employed, when as is shown in FIG. 5 the graphitized layer 23, which in the third embodiment is deposited on all the inner walls of the box 13 and the doors 14, is deposited only on the minimum required area A, which apparently is irradiated by ultraviolet rays emitted by the electrode tubes 15, substantially the same effects are acquired as are obtained in the third embodiment. Further, in the laser oscillator in FIG. 5 a gas duct 25 downstream of the laser gas discharge area is irradiated by ultraviolet rays, but since the duct 25 is curved, the ultraviolet rays do not return to the resin portion. Therefore, downstream there is little need for a graphitized layer 23. On the contrary, since ultraviolet rays emitted by the electrode tubes 15 are projected radially upstream of the laser gas discharge area and strike the area A in FIG. 5, and since the deterioration of the resin portions is accelerated by reflected ultraviolet rays, the graphitized layer 23 must be deposited on this portion to absorb the ultraviolet rays.

For the laser oscillator in this embodiment, since the size of a metal plate 24 is equal to or smaller than 1/15 of a door 14, a compact metal plate 24 is provided.

Fifth Embodiment

Figure 6:
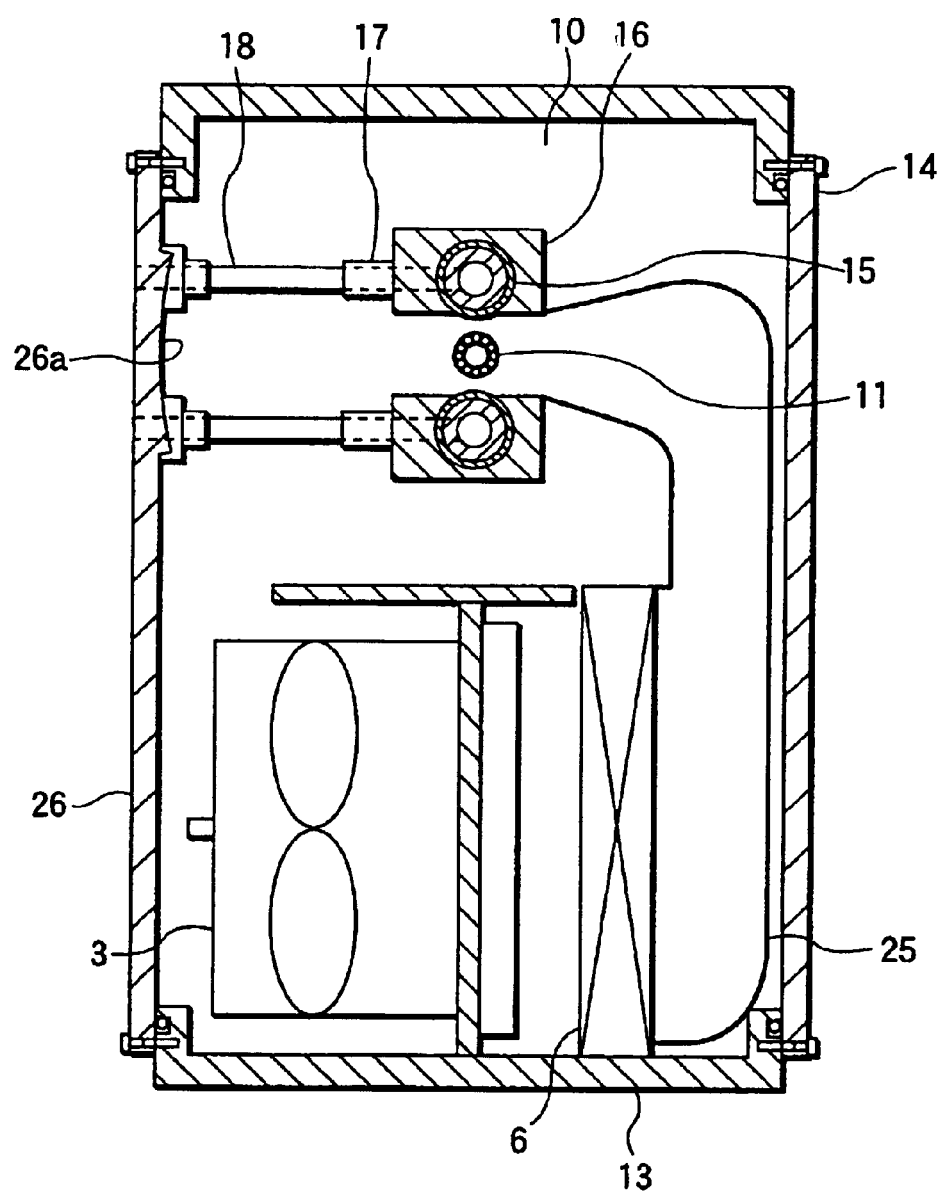
FIG. 6 is a schematic diagram illustrating a laser oscillator according to a fifth embodiment of the invention.

A laser oscillator according to a fifth embodiment will now be described while referring to FIG. 6. In FIG. 6, components denoted by reference numerals 3, 6, 10, 11, 13 to 18 and 25 are identical to or correspond to those in FIG. 5, and no further explanation for them will be given. Also, in FIG. 6, on the inner wall of a door 26 that is attached to a box 13, a recessed portion 26a is formed to condense and reflect light.

The inner walls of the box 13 and the surface of the door 26 are recessed. And when ultraviolet rays produced by a discharge are emitted, the ultraviolet rays are condensed and reflected at a constant curvature at the surface of the recessed portion 26a on the door 26. The reflected ultraviolet rays are condensed and do not irradiate insulators 16, joints 17 and pipes 18, and after being condensed are scattered and reflected downward into a gas duct 25 that is provided farther downstream. In this manner, irradiation of the insulators 16, the joints 17 and the pipes 18 by the scattered light is prevented, and the useful lives of the parts in the laser oscillator are extended.

Sixth Embodiment

Figure 7:
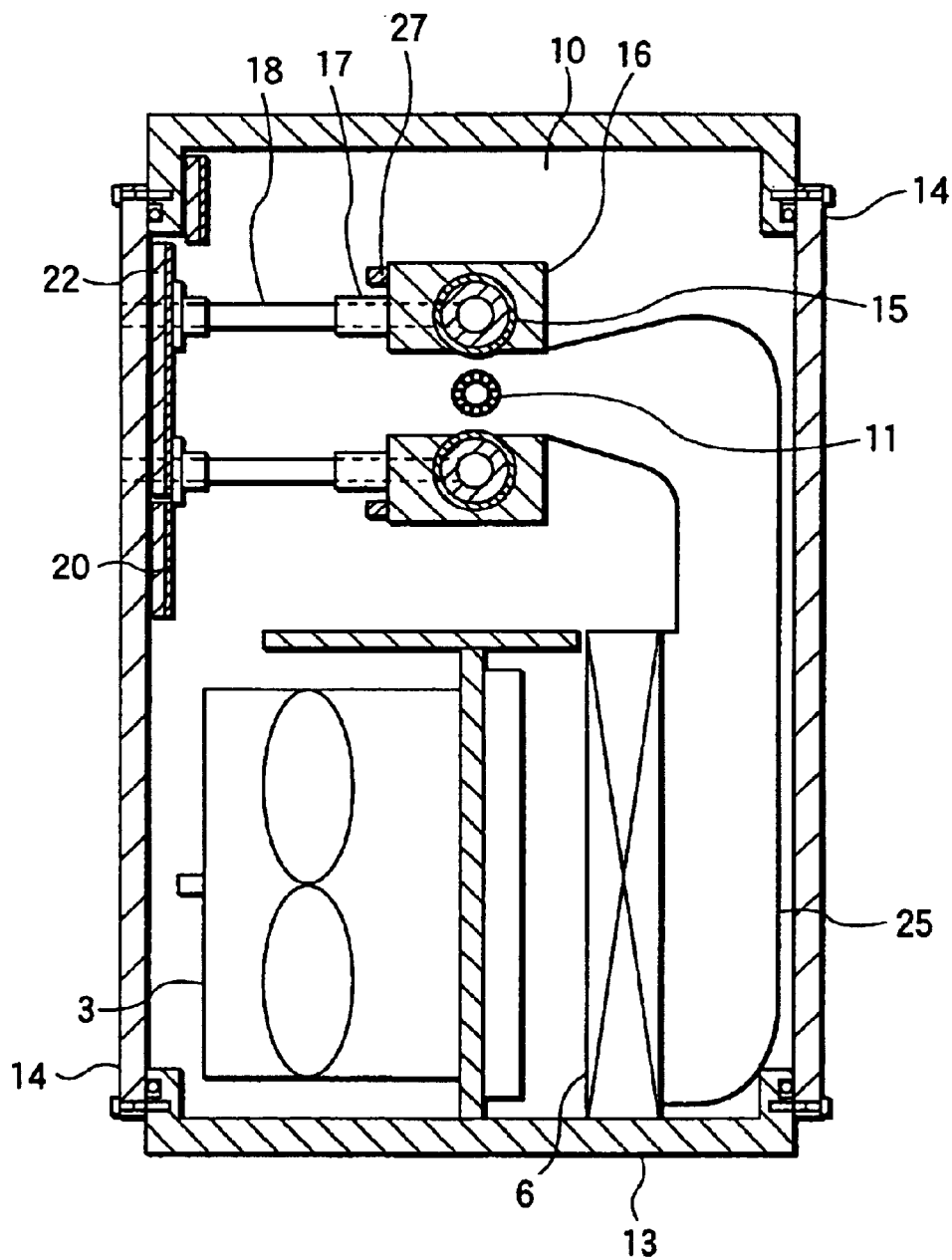
FIG. 7 is a schematic diagram illustrating a laser oscillator according to a sixth embodiment of the invention.

A laser oscillator according to a sixth embodiment of the invention will now be described while referring to FIG. 7. In FIG. 7, components denoted by reference numerals 3, 6, 10, 11, 13 to 18, 20 and 22 are identical to or correspond to those in FIG. 3, and no further explanation for them will be given. Also, in FIG. 7, optical sensors 27 is attached to the surfaces of insulators 16.

In order to detect the deteriorated state of a metal plate 22 on which an optical catalyst layer 20 has been deposited, the optical sensors 27 are attached to the surfaces of the insulators 16 that are irradiated by reflected ultraviolet rays, and monitor the quantity of received light. Then, when there is a specific change in the quantity of reflected light, the optical sensors 27 are activated and detect the change in the reflected light, so that the deterioration of the optical catalyst layer 20 on the metal plate 22 is immediately detected. Thereafter, based on the operation of the optical sensors 27, only the metal plate 22 must be replaced, and the useful lives of the parts in the laser oscillator are extended.

The optical sensors 27 used in this embodiment are ultraviolet detectors that are equipped with filters, or Si photodiodes for spectromeasurement.

An optical sensor 27 may be attached to the surface of a member, such as an insulator 16, a joint 17 or a pipe 18, for which deterioration by ultraviolet rays should be prevented, or one may be attached near the door 14, so that the light reflected by the door 14 can be received by the nearest optical sensor 27.

Figure 8:
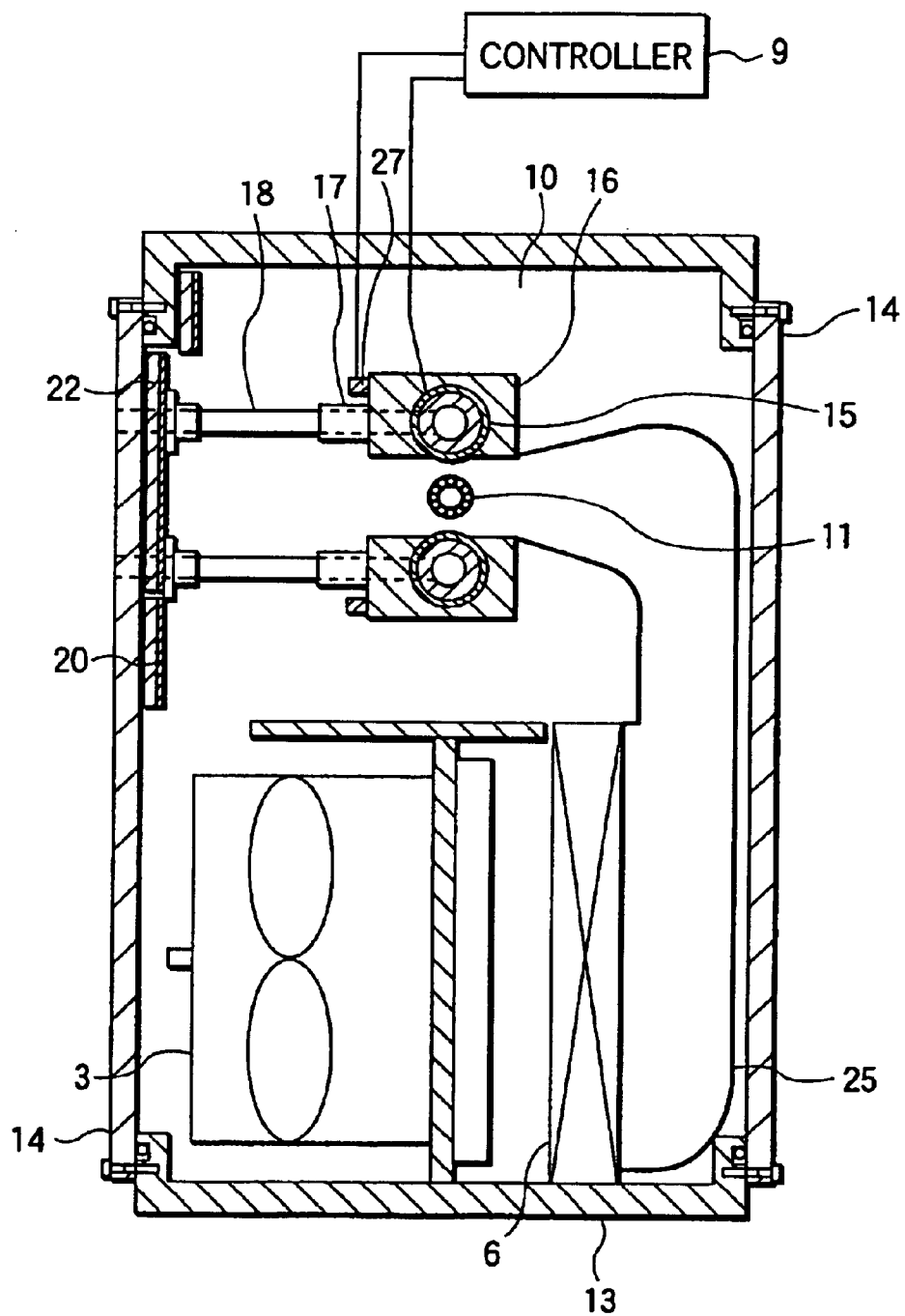
FIG. 8 is a schematic diagram illustrating the laser oscillator according to the sixth embodiment of the invention.

Further, as is shown in FIG. 8, in order to more precisely relay notification of the activation of an optical sensor 27, an activation signal from the optical sensor 27 is fetched by a controller 9, and upon the receipt of the signal, the controller 9 immediately transmits an abnormality alarm. As a result, since the deterioration of the optical catalyst layer 20 attached to the metal plate 22 is detected, replacement of the metal plate 22, on the surface of which the optical catalyst layer 20 is formed, is performed at an appropriate time, and the useful lives of the parts in the laser oscillator are extended.

Seventh Embodiment

Figure 9:
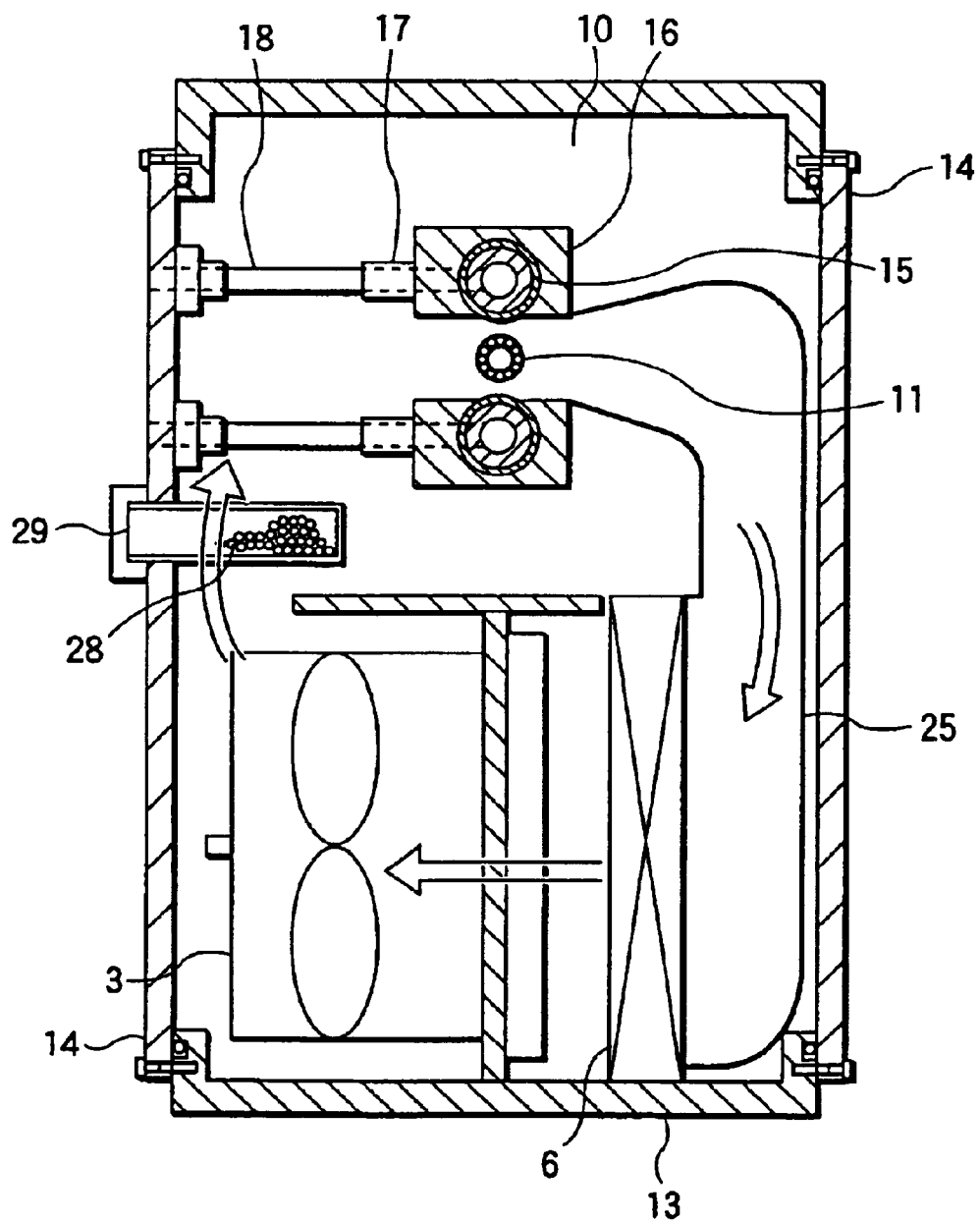
FIG. 9 is a schematic diagram illustrating a laser oscillator according to a seventh embodiment of the invention.

A laser oscillator according to a seventh embodiment of the invention will now be explained while referring to FIG. 9. In FIG. 9, components denoted by reference numerals 3, 6, 10, 11, 13 to 18 and 25 are identical to or correspond to those in FIG. 1, and no further explanation for them will be given. Also, in FIG. 9, a collector 28, such as fluoride hydrogen (HF), is stored in a container 29.

When a discharge is performed by the laser oscillator, as previously described, hydrogen fluoride is generated and accelerates the deterioration of the parts in a box 13 so that the life spans of the parts are reduced. So long as no free hydrogen fluoride is present, however, no deterioration of the silicon resin and glass that constitute the discharge electrodes occurs. But while hydrogen fluoride can be easily collected and removed by water, the dew point in a gas laser device is low, and insufficient water is present in the box 13 to absorb the hydrogen fluoride that is produced. Thus, a water absorbent, such as activated carbon, is selected for use as a collector, and after it has been adequately saturated with water, it is positioned in an area through which laser gas is circulated, so that the hydrogen fluoride in the laser gas can be absorbed.

As is described above, hydrogen fluoride is generated by the binding to water of the fluorine present in a box 13. However, as is further described above, in an environment in which an abundance of water is available, a balance is maintained between the relative quantities of fluorine and hydrogen. And thus, while only a constant amount of hydrogen fluoride is generated, the hydrogen fluoride that is produced is constantly being removed by the water. Therefore, without increasing the overall humidity in a box 13, the effective absorption of hydrogen fluoride can be facilitated by providing at a specific location a collector that has absorbed an adequate amount of water.

The configuration whereby hydrogen fluoride is removed from the laser gas has been explained. But since in activated carbon there are many small, powdery particles, and since such small particles will be dispersed and suspended in the atmosphere inside a box 13 when a normal filter or annealed metal is employed, it can be easily apprehended that this will contribute to the deterioration of optical parts.

When aluminous silica gel is employed, an oxide reductive reaction facilitates the absorption of hydrogen fluoride. And therefore, when a collector is positioned along a gas circulation path, the amount of hydrogen fluoride in a box 13 can be reduced. Further, when silica gel that has been formed into pellets is used, the dispersion and suspension of powdered dust in the atmosphere can be prevented. But Since more or less dust is generated even by pellets, the pellets are stored in a small container composed of a mesh-like material, like a filter or an annealed metal container, that permits the passage of laser gas but blocks and prevents the dispersion of dust. The size of the mesh used for such a container is several hundreds of $\mu$m or smaller. With this arrangement, the amount of hydrogen fluoride can be reduced, the deterioration of glass and silicon resin and of members used in the laser device are prevented, and the useful life of the laser device can be extended.

Since the absorption function of aluminous silica gel is drastically reduced when there is an increase in temperature, in a laser oscillator the absorbent must be located along the gas circulation path at a position that precedes a discharge area, whereat the temperature is especially high. In addition, since the absorbent must absorb the hydrogen fluoride contained in the laser gas, it is preferable that the absorbent be placed at a location whereat it is in direct contact with the gas stream.

Eighth Embodiment

Figure 10:
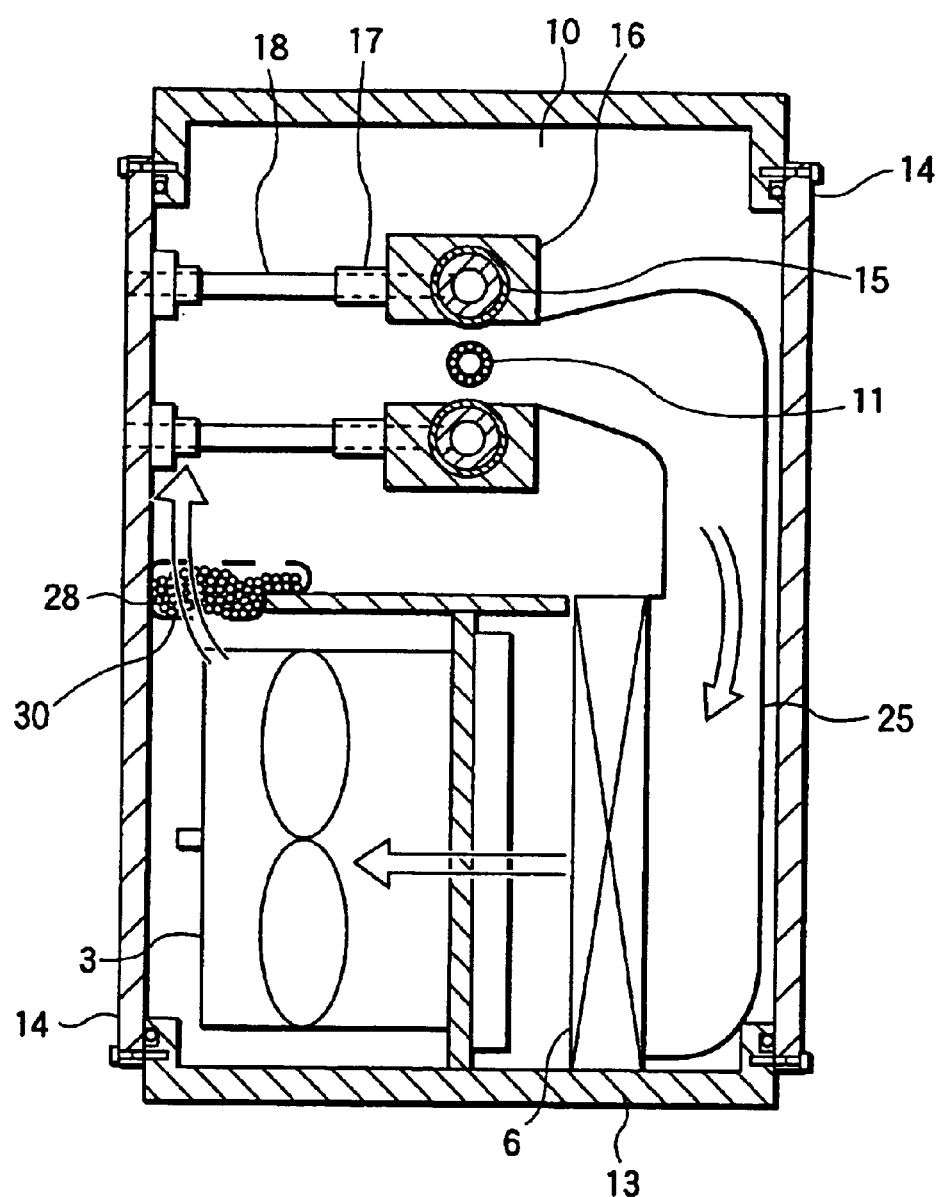
FIG. 10 is a schematic diagram illustrating a laser oscillator according to an eighth embodiment of the invention.

A laser oscillator according to an eighth embodiment of the invention will now be described while referring to FIG. 10. In FIG. 10, components denoted by reference numerals 3, 6, 10, 11, 13 to 18, 28 and 28 are identical to or correspond to those in FIG. 9, and no further explanation for them will be given. Also, in FIG. 10, a container 30 formed of a fiber mesh is placed inside a box 13.

When a discharge is performed by the laser oscillator, as described above, hydrogen fluoride is generated. However, as is also described in the prior art, since a C—Cl binding is also severed by ultraviolet rays, depending on whether an engineer plastic, such as vinyl chloride, is used for a member, chlorine (Cl) is also generated. In the box 13, vinyl chloride is used for a pipe member (not shown) for supplying cooling water to a discharge electrode 2.

A full-reflective mirror formed of applying a gold coating to copper is employed as a resonator. In this case, copper and chlorine are easily bound and copper chloride ($CuCl_2$) is generated. Normally, while one property of copper is that it reflects infrared rays, copper chloride tends to absorb infrared rays, so that an infrared laser beam, such as a carbon diode laser beam, tends to be absorbed by the copper chloride. Therefore, a problem has arisen in that the function of the full-reflective mirror is degraded, i.e., the reflectivity is reduced, and the laser output is reduced.

While chlorine can be absorbed by activated carbon, when it is used, powdered activated carbon dust composed of particles several μm in diameter are produced. When this dust attaches itself to the resonator, the optical parts may be burnt or damaged, and thus, when a process is performed, the generation of this dust must be prevented. But annealed metal can not be employed for this purpose, since at the most, the smallest opening obtainable with such a filter is 20 μm. Therefore, in order to permit the passage of a laser gas and to prevent the generation of the powdered activated carbon dust, a container is formed of fiber membrum or a hollow texture film made of tetrafluoro type Teflon, and the activated carbon is sealed in this container. As a result, since the powdered dust is not dispersed within the box 13 and since the laser gas can pass through the film, the chlorine that is generated can be absorbed and removed from the box 13, and the useful life of the laser oscillator can be extended.

As is described above, according to the invention, since once $CO_2$ has been decomposed by a laser discharge it can be re-produced by using an optical catalyst layer, the consumption of $CO_2$ in the laser gas can be limited, and not only the deterioration of the laser gas but also a decrease in the laser output can be prevented, and a stable laser output obtained for an extended period of time.

In addition, since an optical catalyst layer is formed on a plate separate from the inner walls of the box, when deterioration of an optical catalyst layer occurs, the layer can be easily replaced with a new one.

Further, since ultraviolet rays generated by a laser discharge are absorbed by a graphitized layer, the irradiation by ultraviolet rays of internally provided parts can be prevented and the useful lives of parts extended, and, accordingly, a stable laser output can be obtained for an extended period of time.

Furthermore, since the graphitized layer is formed on a plate separate from the inner walls of the box, when deterioration of a graphitized layer occurs, the layer can easily be replaced with a new one.

Moreover, reflection means is provided that has a reflective face at which ultraviolet rays generated by a laser discharge are received and reflected, so that the rays can pass through the discharge space defined by a pair of discharge electrodes. Thus, the reflected ultraviolet rays can be condensed, and collectively reflected in a constant direction so that ultraviolet ray irradiation of internally provided parts is prevented and the useful lives of the parts in the laser oscillator are extended. Accordingly, a stable laser output can be obtained for an extended period of time.

Also, since sensors for detecting ultraviolet rays are provided, when a signal from one of the sensors is transmitted to a controller, the controller issues a warning when the intensity of the ultraviolet light exceeds a predetermined value. Therefore, the useful lives of the parts in the laser optical are extended, and a stable laser output can be obtained for an extended period of time.

And since inside a box, a collector is provided between cooling means and laser oscillation means along a laser gas circulation path, hydrogen fluoride and chlorine can be collected. Therefore, the deterioration of components, such as optical parts, in a laser oscillator can be prevented, and a stable laser output can be obtained for an extended period of time.

What is claimed is:

1. A laser oscillator comprising:

laser oscillation means for employing a discharge to excite a laser and to generate a laser beam, wherein the laser oscillation means comprises at least a discharge electrode including an electrode tube and an insulator;

a box for storing said laser oscillation means; and an optical catalyst layer formed on the inner wall of said box, at a location where ultraviolet rays generated by said discharge are exposed, for absorbing said ultraviolet rays.

2. A laser oscillator comprising:

laser oscillation means for employing a discharge to excite a laser gas and to generate a laser beam;

a box for storing said laser oscillation means; and a plate member provided at an inner wall of said box, at a location where ultraviolet rays generated by said discharge are exposed, and on which an optical catalyst layer is formed, for absorbing said ultraviolet rays.

3. A laser oscillator comprising:

laser oscillation means for employing a discharge to excite a laser gas and to generate a laser beam;

a box for storing said laser oscillation means; and a graphitized layer formed on the inner wall of said box at a location where ultraviolet rays generated by said discharge are exposed.

4. A laser oscillator comprising:

laser oscillation means for employing a discharge to excite a laser gas and to generate a laser beam;

a box for storing said laser oscillation means; and a plate member provided at an inner wall of said box, at a location where ultraviolet rays generated by said discharge are exposed, and on which a graphitized layer is formed.

5. A laser oscillator according to claim 3 or 4, wherein said graphitized layer absorbs ultraviolet rays.

6. A laser oscillator comprising:

laser oscillation means for employing a discharge by a pair of discharge electrodes that face each other across an intervening discharge space to excite a laser gas and to generate a laser beam;

a box for storing said laser oscillation means; and a recess portion arranged in said box for receiving ultraviolet rays generated by said laser oscillation means, and for reflecting said ultraviolet rays so that the reflected light passes through said discharge space between said pair of discharge electrodes.

* * * * *